United States Patent [19]

Charkey

[11] 4,332,871
[45] Jun. 1, 1982

[54] ZINC ELECTRODE WITH CEMENT ADDITIVE

[75] Inventor: Allen Charkey, Brookfield, Conn.

[73] Assignee: Energy Research Corporation, Danbury, Conn.

[21] Appl. No.: 187,335

[22] Filed: Sep. 15, 1980

[51] Int. Cl.³ .............................................. H01M 4/36
[52] U.S. Cl. .................... 429/217; 429/219; 429/223; 429/224; 429/229
[58] Field of Search ............... 429/229, 231, 232, 217, 429/219, 223, 224, 222, 228

[56] References Cited

U.S. PATENT DOCUMENTS

| | | | |
|---|---|---|---|
| 2,962,540 | 11/1960 | Kordesch | 429/232 |
| 3,042,732 | 7/1962 | Kordesch | 429/217 |
| 3,113,050 | 12/1963 | Kordesch et al. | 429/232 X |
| 3,493,434 | 2/1970 | Goodkin | 429/231 |
| 3,816,178 | 6/1974 | Maki et al. | 429/231 X |
| 4,022,953 | 5/1977 | Charkey | 429/229 |
| 4,084,047 | 4/1978 | Himy et al. | 429/229 X |

*Primary Examiner*—Anthony Skapars

[57] ABSTRACT

A zinc electrode having a cement additive, preferably, Portland Cement, distributed in the zinc active material.

22 Claims, No Drawings

ZINC ELECTRODE WITH CEMENT ADDITIVE

BACKGROUND OF THE INVENTION

This invention relates to secondary batteries and, in particular, to zinc negative electrodes for use in such batteries.

A significant class of secondary batteries such as, for example, silver-zinc, zinc-oxygen and, in particular, nickel-zinc look to the incorporation of zinc active material in the negative battery electrode. However, use of a zinc negative electrode has been found to result in limited battery life, owing to the inability of the zinc electrode to effectively operate for a large number of battery charge-discharge cycles. A primary cause of this short cycle life is the solubility of the zinc active material in the battery electrolyte. Such solubility results in a redistribution of the zinc active material on the electrode current collector (so-called "shape change") and growth of zinc dendrites in the cell. The former leads to passivity of the zinc electrode and the latter to shorting of the zinc electrode and its associated positive electrode, the battery in either case being rendered inoperative. These effects are further aggravated in batteries, such as, for example, nickel zinc batteries, where overcharging is required to maintain the electrical capacity of the positive electrode during cycling.

A further factor contributing to limited zinc electrode cycle life is the swelling of the battery positive electrode. Such swelling is particularly pronounced in nickel-zinc cells and results in considerable pressure being exerted on the zinc electrode. The electrode is thereby reduced in thickness and loses electrolyte (is dried), whereby passivity and failure of the electrode are accelerated.

The prior art has attempted to counter the aforesaid undesirable characteristics of zinc electrodes in a variety of ways. In particular, electrode constructions adapted to alleviate the undesirable phenomena attributable to zinc solubility, have been disclosed in a number of U.S. patents. In U.S. Pat. No. 3,873,367, electrode constructions are disclosed wherein constituents such as calcium or magnesium hydroxide are incorporated in the zinc active material for reacting with same to form zincates which are substantially insoluble in the cell electrolyte.

U.S. Pat. No. 4,022,953, assigned to the same assignee hereof, discloses further electrode constructions wherein cadmium is added to the zinc active material to provide inert nucleation cites for zinc to replate during charging. U.S. patent application Ser. No. 163,935, filed June 27, 1980 teaches an electrode construction wherein nucleation cites for replating of zinc are provided by zinc titanate or zinc fluoride additives to the active material.

While these electrode constructions have provided some measure of improvement with regard to zinc solubility, battery designers are searching for constructions which exhibit still more improvement. Furthermore, constructions are being sought which offer resistance to positive electrode swelling.

It is therefore an object of the present invention to provide a negative zinc electrode adapted to overcome the shortcomings of prior art zinc electrodes.

It is a further object of the present invention to provide zinc electrode which is resistive to shape change and dendritic growth.

It is yet a further object of the present invention to provide a zinc electrode which resists the effects (thickness reduction and drying) of positive electrode swelling.

It is still a further object of the present invention to provide a zinc electrode for a nickel-zinc battery.

It is a further object of the present invention to provide a zinc electrode for use in alkaline batteries which has extended life during cycling due to improved physical structure and insensitivity to continuous overcharge.

SUMMARY OF THE INVENTION

In accordance with the principles of the invention, the above and other objectives are realized in a zinc electrode wherein incorporated in the zinc active material is a cement additive. As used herein a cement additive is defined as a composition comprised of 70-80 percent calcium silicate, 1-10 percent calcium aluminate, 5-12 percent calcium aluminum ferrite, and 6-10 percent other constituents including calcium sulfate. Preferably, the additive is what is commonly known as Portland Cement and is included in the electrode in an amount equal to from about 5 to 30 percent by weight of the zinc active material.

DETAILED DESCRIPTION

As above-indicated, the basis of the present invention is the addition to a zinc electrode of a cement additive which is found to enhance the structural integrity of the electrode, while simultaneously preventing the zinc active material from going into solution. The overall electrode structure is thereby found to exhibit deep discharge-recharge cycling capacity in excess of 250 cycles with more than 10% overcharge occurring on each recharge portion of the cycle.

The cement additive of the subject zinc electrode undergoes chemical interaction with the cell electrolyte such that each constituent of the additive produces a hydrate which constitutes the solid cement. A continuous solid matrix thereby results in the space originally occupied by the discrete constituent particles. In particular, the hydration products occupy whatever amount of space is available forming a solid structure without a change in volume. The resultant rigid, non-compressable zinc electrode is believed to have improved structural integrity, owing to its ability to now resist pressures exerted by expansion of the positive counter-electrode when in a cell construction.

It also has been unexpectedly found that the zinc electrode with cement additive is rendered more insoluble, whereby the electrode is more resistant both to shape change and to the growth of zinc dendrites, even in cell constructions such as, nickel-zinc, where overcharging is required during cycling. It is believed that the zinc active material reacts chemically with some or all of the constituents of the cement additive to produce insoluble zinc compounds with a lower hydrogen over voltage than elemental zinc. Simply stated this means that gaseous hydrogen is produced on the surface of the zinc electrode during some portion of the charging cycle in favor of the growth of deleterious zinc dendrites. It is further believed that the water of hydration contained in the cement additive acts as a reservoir to prevent drying out of the zinc electrode during cycling.

In a preferred embodiment of an electrode construction in accordance with the invention, zinc oxide, a cement additive comprised of Portland Cement, cadmium oxide, lead oxide, and a binder therefor, such as polytetrafluoroethylene (PTFE), are admixed and the resulting electrode mixture is kneaded to a dough-like consistency with the aid of a non-aqueous organic lubricant. The kneaded electrode mixture is then rolled to form a continuous sheet having a thickness in a range of from about 10 to 100 mils and, preferably, from about 30 to 50 mils.

An electrode is fabricated by applying two of the above sheets to either side of a copper foil current collector which is about 2.0 mils thick. The final thickness of the electrode may range from about 20 to 100 mils and, preferably, from about 40 to 70 mils.

In the foregoing practice, the Portland Cement may be a commercially available powder meeting ASTM Standards Type I or Type II, Specification No. C150-77 and Federal Specification SS-C-1960/3A. The typical composition of the
Portland Cement may be:

75% ($3CaO.SiO_2 + 2\beta CaO.SiO_2$)

5-10% ($3CaO.Al_2O_3$)

5-10% ($4CaO.Al_2O_3.Fe_2O_3$)

5% ($CaSO_4$)

2-5% ($MgO$)

Other typical compositions may be:

80% ($3CaO.SiO_2 + 2\beta CaO.SiO_2$)

2% ($3CaO.Al_2O_3$)

12% ($4CaO.Al_2O_3.Fe_2O_3$)

6% ($CaSO_4$ + free $CaO$ + absorbed moisture)

or

70% ($3CaO.SiO_2 + 2\beta CaO.SiO_2$)

8% ($3CaO.Al_2O_3$)

12% ($4CaO.Al2O_3.Fe_2O_3$)

10% ($CaSO_4$ + free $CaO$ + absorbed moisture)

A discussion of Portland Cement compositions can be found in the text *Solidification of Portland Cement* by Robert Brady Williamson (Pergamon Press 1972).

The zinc oxide may be a commercially available powder known as New Jersey zinc oxide U.S. P. 19. The PTFE may be a powder commercially available as DuPont Teflon powder No. 6C. A suitable solvent is a commercially available Shell Sol B, a petroleum solvent having a gravity of 70.8 APT, an aniline point of 129° F., and a composition by volume of 65.5% paraffins, 32% napthene and 2.5% aromatics. Such solvent is used in amounts of 40 to 90% by weight of the total solids in the electrode mixture.

The Portland Cement is employed in the electrode structure in an amount by weight of from 5 to 30% of the weight of the zinc active material. In the particular preferred practice under discussion, the Portland Cement is 10% by weight of the total solids in the electrode mixture. The weight of cadmium oxide is 2% by weight and the weight of lead oxide is 1% by weight of such total solids. The latter materials provide added corrosion resistance for the zinc and need not be employed where such added resistance is not required. The PTFE is present in an amount of 3.0% by weight of the total solids in the electrode mixture.

Zinc electrodes with the above constituent makeup, the above dimensions and with zinc oxide active material in the amount of 90 grams are constructed and employed as the negative electrodes in an alkaline battery. The positive electrodes of the battery are each comprised of a polymer-bound nickel hydroxide plate containing 85 grams of active material, 35 grams of graphite and 1.25 grams of PTFE. Each zinc electrode is wrapped in one layer of fuel-cell grade asbestos sheet of about 10 mils thick and each positive electrode is wrapped in one layer of 5 mil thick non-woven polyamide; the former is manufactured by Quin-T Corporation and the latter by Pellon Corporation. The main separator comprises three layers of Celgard coated with Cellulose acetate manufactured by Celanese Corporation and designated K-306. The battery is filled with an aqueous electrolyte containing 35% by weight potassium hydroxide and 1% by weight lithium hydroxide.

The battery is then activated, such activation, as above-described, causing each of the constituents of the Portland Cement additive to react with the aqueous phase of the electrolyte to give solid hydrated products that form a cementaceous electrode structure. Following activation, the battery is subjected to charge-discharge cycling wherein it is charged at 3.66 amperes for 6 hours and discharged at 10 amperes for 2 hours or until the voltage reaches 1.25 volts whichever occurs first. The cycling regimen is designed to remove 20 ampere-hours of capacity during discharge and replace 22 ampere-hours during charge. During cycling, the input capacity is invariant so that as the cell capacity declines somewhat, the amount of overcharge is increased, thereby accelerating the modes of failure.

The following Table gives the performance characteristics of the fabricated nickel-zinc battery. To provide a comparison for evaluating the battery performance, the Table further presents cyclic capacity data of a comparison battery differing from the Portland Cement-additive battery solely in respect of its negative electrode composition. The comparison battery negative electrodes are each prepared from a mixture containing 2% cadmium oxide, 1% lead oxide, 3% PTFE and the remainder zinc oxide. With the addition of a lubricant, as discussed above, the latter mixture is also kneaded and rolled to a thickness of 30 to 50 mils and pressed onto a solid copper foil collector to form each negative electrode.

| | Battery of Invention Negative Electrode Composition 84% ZnO + 3% PTFE +10% PORTLAND CEMENT +2% CdO + 1% PbO | | Comparison Battery Negative Electrode Comparison 94% ZnO + 3% PTFE 2% CdO + 1% PbO | |
|---|---|---|---|---|
| CYCLE NO. | CAPACITY AMPERE-HOURS | END OF CHARGE VOLTAGE Volts | CAPACITY AMPERE-HOURS | END OF CHARGE VOLTAGE Volts |
| 5 | 17.5 | 2.02 | 17.5 | 1.98 |
| 25 | 17.5 | 2.02 | 17.5 | 2.04 |
| 50 | 17.5 | 2.00 | 17.0 | 2.08 |
| 75 | 18.5 | 2.00 | 16.5 | 2.10 |
| 100 | 18.5 | 2.02 | 16.0 | 2.04 |
| 150 | 15.0 | 2.02 | 12.5 | 2.00 |
| 200 | 15.0 | 2.02 | | |
| 250 | 13.0 | 2.00 | | |
| 260 | 12.5 | 2.00 | | |

As evidenced by the data of the table, the battery of the invention gave good performance for 260 charge-discharge cycles before its capacity dropped to 70% of its initial output. The comparison battery began declining in performance after 100 such cycles and failed after 150 cycles. As can be further observed, the battery of the invention yielded a substantially lower end-of-charge voltage throughout its useful life than would be normally expected under these charging conditions and which, when compared to the comparison battery, was about 20-100 millivolts lower. Eventually, the voltage of the comparison battery also dropped at the end-of-charge, but this was due to shorting caused by zinc dendrites growing through the separator material. Dissassembly of both batteries revealed that the negative electrodes of the comparison battery had dried out, densified and exhibited more than 50% loss of active material. In comparison, the negative electrodes of the invention still retained ample electrolyte, exhibited a porous rigidized cement-like structure and showed only a 20% loss of active area.

The inability of the comparison battery to retain its capacity on repetitive charge-discharge cycling may be attributed to densification of the zinc active material of the negative electrodes as a result of the expansive forces exerted by the corresponding positive electrodes, these forces also resulting in explusion of electrolyte. Further losses in performance are a result of premature shorting, due in part to the higher charging voltage reached at the end-of-charge.

In the negative electrodes of the invention these phenomena are negated because of the pressure resistance imparted to the zinc electrodes by the cement additive. The presence of low hydrogen overvoltage compounds in the cement, such as, calcium alimino ferrite, also prevents premature shorting due to the inhibiting of zinc dendrite growth.

While the preferred make-up of cement additive is Portland Cement, as described in the foregoing example, it is believed that other admixtures of the constituents thereof will produce similarly desirable results.

In all cases, it is understood that the above-described arrangements are merely illustrative of the many possible specific embodiments which represent applications of the present invention. Numerous and varied other arrangements can readily be devised in accordance with the principles of the present invention without departing from the spirit and scope of the invention.

What is claimed is:

1. A zinc electrode comprising a zinc active material and a cement additive distributed therein, said cement additive comprising 70-80% calcium silicate, 1-10% calcium aluminate, 5-12% calcium aluminum ferrite, 6-10% other constituents including calcium sulfate.

2. A zinc electrode in accordance with claim 1 wherein:
said cement additive is about 5 to 30% by weight of said zinc active material.

3. A zinc electrode in accordance with claim 1 or 2 wherein:
said cement additive is Portland Cement.

4. A zinc electrode in accordance with claim 3 further including:
a binder for said active material and said cement additive.

5. A zinc electrode in accordance with claim 4 wherein:
said binder comprises polytetrafluorethylene.

6. A zinc electrode in accordance with claim 5 wherein:
said zinc active material comprises zinc oxide; and said electrode further comprises cadmium oxide and lead oxide.

7. A zinc electrode in accordance with claim 1 or 2 wherein:
calcium aluminate is 50 percent or greater of said other constituents.

8. A zinc electrode in accordance with claim 1 or 2 wherein:
said other constituents include MgO.

9. A zinc electrode in accordance with claim 1 or 2 wherein:
said other constituents include free CaO and moisture.

10. A secondary battery comprising:
a positive electrode including a first active material;
a negative electrode including a zinc active material and a cement additive, said cement additive comprising 70-80% calcium silicate, 1-10% calcium aluminate, 5-12% calcium aluminum ferrite, 6-10% other constituents including calcium sulfate.

11. A battery in accordance with claim 10 wherein:
said cement additive is about 5 to 30% by weight of said zinc active material.

12. A battery in accordance with claim 10 or 11 wherein:
said cement additive is Portland Cement.

13. A battery in accordance with claim 12 wherein:
said first-active material comprises nickel.

14. A battery in accordance with claim 12 wherein:

said first active material comprises silver.

15. A battery in accordance with claim 12 wherein: said first active material comprises manganese.

16. A battery in accordance with claim 12 wherein: said positive electrode is an oxygen electrode.

17. A battery in accordance with claim 12 wherein: said negative electrode further comprises a binder.

18. A battery in accordance with claim 17 wherein: said binder is polytetrafluorethylene.

19. A battery in accordance with claim 18 wherein: said zinc active material comprises zinc oxide; and said negative electrode further comprises cadmium oxide and lead oxide.

20. A battery in accordance with claim 10 or 11 wherein: calcium sulfate is 50 percent or greater of said other constituents.

21. A battery in accordance with claim 10 or 11 wherein: said other constituents include MgO.

22. A battery in accordance with claim 10 or 11 wherein: said other constituents include free CaO and moisture.

* * * * *